United States Patent [19]

Ikeda

[11] Patent Number: 5,134,695
[45] Date of Patent: Jul. 28, 1992

[54] METHOD AND APPARATUS FOR CONSTANT STRIDE ACCESSING TO MEMORIES IN VECTOR PROCESSOR

[75] Inventor: Masayuki Ikeda, Kawasaki, Japan

[73] Assignee: Fujitsu Ltd., Kawasaki, Japan

[21] Appl. No.: 616,738

[22] Filed: Nov. 21, 1990

Related U.S. Application Data

[63] Continuation of Ser. No. 166,489, Mar. 10, 1988, abandoned.

[30] Foreign Application Priority Data

Mar. 13, 1987 [JP] Japan .................................. 62-59484

[51] Int. Cl.⁵ ...................... G06F 12/06; G06F 9/355
[52] U.S. Cl. ..................................... 395/400; 395/425
[58] Field of Search ............................ 364/200, 900

[56] References Cited

U.S. PATENT DOCUMENTS

| | | | |
|---|---|---|---|
| 3,597,745 | 8/1971 | Lahrson et al. | 364/900 |
| 4,149,239 | 4/1979 | Jenkins et al. | 364/200 |
| 4,333,160 | 6/1982 | Kobari et al. | 364/900 |
| 4,352,165 | 9/1982 | Hevenor, Jr. | 364/900 |
| 4,370,732 | 1/1983 | Kogge | 364/900 |
| 4,394,725 | 7/1983 | Bienvenu et al. | 364/200 |
| 4,438,512 | 3/1984 | Hartung et al. | 364/900 |
| 4,570,236 | 2/1986 | Rebel et al. | 364/200 |
| 4,598,403 | 7/1986 | Odaka | 371/37.7 |
| 4,613,935 | 9/1986 | Couleur | 364/200 |
| 4,665,479 | 5/1987 | Oinaga | 364/736 |
| 4,727,474 | 2/1988 | Batcher | 364/200 |
| 4,727,510 | 2/1988 | Scheuneman et al. | 364/900 |
| 4,742,517 | 5/1988 | Takagi et al. | 371/37.4 |
| 4,755,931 | 7/1988 | Abe | 364/200 |
| 4,766,535 | 8/1988 | Auerbach et al. | 364/200 |
| 4,819,152 | 4/1989 | Deerfield et al. | 364/200 |
| 4,843,543 | 6/1989 | Isobe | 364/200 |
| 4,855,903 | 8/1989 | Carleton et al. | 364/200 |
| 4,860,252 | 8/1989 | Sykora | 364/900 |
| 4,901,230 | 2/1990 | Chen et al. | 364/200 |

FOREIGN PATENT DOCUMENTS

0146943 12/1984 European Pat. Off. .

OTHER PUBLICATIONS

D. T. Harper III et al., "The 13th Annual International Symposium on Computer Architecture," 2nd–5th Jun., 1986, pp. 324–327, Tokyo, Japan.

IBM Technical Disclosure Bulletin, vol. 27, No. 11, Apr. 1985, "Address Mapping for a Memory System with a Prime Number of Banks", pp. 6369–6372.

Primary Examiner—Alyssa H. Bowler
Assistant Examiner—Jack A. Lane
Attorney, Agent, or Firm—Staas & Halsey

[57] ABSTRACT

A method and apparatus for generating addresses for a constant stride vector addressed memory device. An address generator generates address indices following an equation $$c.D = 1 (mod\ B)$$

where B is the bank number of the memory device, D is the stride of the vector addressed memory device and c is a positive integer corresponding in a delta index. By doing so, the requested addresses are successively generated in order of bank addresses of the memory device and, the waiting time of prior constant stride vector access methods is eliminated. And the throughput of the memory device is improved.

10 Claims, 14 Drawing Sheets

| BANK NO. → | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| ADDRESS NO. → | 0 | 21 | 12 | 3 | 24 | 15 | 6 | 27 | 18 | 9 | 2A | 1B | C | 2D | 1E | F |

FIG. 7

DISTANCE = 5, INTERLEAVE = 16, DELTA = 13

| | | | | | | | | | | | | | | | | |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | |
| 16 | 17 | 18 | 19 | 20 | 21 | 22 | 23 | 24 | 25 | 26 | 27 | 28 | 29 | 30 | 31 | |
| 32 | 33 | 34 | 35 | 36 | 37 | 38 | 39 | 40 | 41 | 42 | 43 | 44 | 45 | 46 | 47 | G-1 |
| 48 | 49 | 50 | 51 | 52 | 53 | 54 | 55 | 56 | 57 | 58 | 59 | 60 | 61 | 62 | 63 | |
| 64 | 65 | 66 | 67 | 68 | 69 | 70 | 71 | 72 | 73 | 74 | 75 | 76 | 77 | 78 | 79 | |
| 80 | 81 | 82 | 83 | 84 | 85 | 86 | 87 | 88 | 89 | 90 | 91 | 92 | 93 | 94 | 95 | |
| 96 | 97 | 98 | 99 | 100 | 101 | 102 | 103 | 104 | 105 | 106 | 107 | 108 | 109 | 110 | 111 | |
| 112 | 113 | 114 | 115 | 116 | 117 | 118 | 119 | 120 | 121 | 122 | 123 | 124 | 125 | 126 | 127 | G-2 |
| 128 | 129 | 130 | 131 | 132 | 133 | 134 | 135 | 136 | 137 | 138 | 139 | 140 | 141 | 142 | 143 | |
| 144 | 145 | 146 | 147 | 148 | 149 | 150 | 151 | 152 | 153 | 154 | 155 | 156 | 157 | 158 | 159 | |
| 160 | 161 | 162 | 163 | 164 | 165 | 166 | 167 | 168 | 169 | 170 | 171 | 172 | 173 | 174 | 175 | |
| 176 | 177 | 178 | 179 | 180 | 181 | 182 | 183 | 184 | 185 | 186 | 187 | 188 | 189 | 190 | 191 | |
| 192 | 193 | 194 | 195 | 196 | 197 | 198 | 199 | 200 | 201 | 202 | 203 | 204 | 205 | 206 | 207 | G-3 |
| 208 | 209 | 210 | 211 | 212 | 213 | 214 | 215 | 216 | 217 | 218 | 219 | 220 | 221 | 222 | 223 | |
| 224 | 225 | 226 | 227 | 228 | 229 | 230 | 231 | 232 | 233 | 234 | 235 | 236 | 237 | 238 | 239 | |
| 240 | 241 | 242 | 243 | 244 | 245 | 246 | | | | | | | | | | |

DISTANCE = 6, INTERLEAVE = 16, DELTA = 3

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |

METHOD AND APPARATUS FOR CONSTANT STRIDE ACCESSING TO MEMORIES IN VECTOR PROCESSOR

This is a continuation of copending application(s) Ser. No. 07,166,489 filed on Mar. 10, 1988 now abandoned.

BACKGROUND OF THE INVENTION

1. Field of the Invention

The present invention relates to a memory device used in vector processor. More particularly it relates to a method of accessing a memory in which data are stored in addresses separated from each other by a constant stride. The invention especially intends to increase the throughput of the memory device.

2. Description of Prior Art

In recent high speed vector processors, the main memory device is divided into a plurality of memory banks enabling parallel access thereto in order to decrease the total access time to many data, and to provide a fail-soft structure for the memory device, that, is to minimize the destruction of the memories when failure occurred.

The data stored in a memory device is accessible by indicating in a program the address numbers of the memory cells where the desired data are stored. In order to make access to a plurality of data which are stored in memory cells having contiguous address numbers, it is unnecessary to indicate all of these addresses in a program. The computer is provided with an address generator which outputs successively the necessary addresses when the starting address and the end address are given, or when the starting address and the length of the address chain are given. So, the data are automatically read out or stored in succession. The group of addresses in which the data are stored in such manner is called in the art a vector address, and a method to make access to such data is called a vector access.

The memory device has a plurality of memory cells arranged in several banks. Each of the memory cells stores a data element, and each of the memory locations are numbered. This number is called an address number or address index. The numbering is interleaved with each bank in a manner as shown in upper half of FIG. 1. Namely, the memory cells are numbered from the first row of the first bank, next to the first row of the second bank and then the first row of the third bank, and so on. And when the first row of the final bank is numbered, the second row of each is numbered in succession. FIG. 1 shows only four banks, and the numbering, therefore, is four-way interleaved, but in general the memory device is provided with many banks depending on the size of memory. So, if the memory device is provided with n banks, the addresses are n-way interleaved, and the number n to identify each of the banks is called the bank number or bank index.

An example of vector access is shown in FIG. 2. When the first address (4 in this example) and the end address (27) are given, the address generator outputs the all of the address indices indicated by the hatching in succession of the address number. The data stored in these memory cells are accessed. The hatched area is a vector address. Such an address is called a contiguous vector address or sequential address and the method to accessing the addresses is called contiguous vector access or sequential access.

But in data processing, it often occurs that it is necessary to make access to the data which are stored in the memory cells which have indices skipping a constant number. An example is shown in FIG. 3. In this example, the number of the banks is 16 so, the address numbers are 16-way interleaved. In FIG. 3, the requested addresses are 0, 3, 6, 9, C, F ... These numbers are expressed in hexa-decimal numerals. They are stored in the addresses skipping two addresses between each other. The difference of the address numbers between neighboring addresses is called as a distance, or a stride. In the above example, therefore, the distance is three. Such addressing is called in the art a distanced vector address or a constant stride address, and the method of accessing such addresses is called a distanced vector access or a constant stride access.

While a method of accessing each memory indicating all of their addresses one by one in a program is called sometimes a scalar access.

The requirement of distanced vector access often occurs in vector or matrix processing. Of course there are many cases other than the matrix processing which need the distanced vector access. A process of distanced vector access will be explained briefly taking an example of matrix processing. Consider a matrix of m row and n column like as, $$\begin{matrix} a_{11} & a_{12} & a_{13} & \cdots & a_{1n} \\ a_{21} & a_{22} & a_{23} & \cdots & a_{2n} \\ \cdot & \cdot & \cdot & & \cdot \\ \cdot & \cdot & \cdot & & \cdot \\ \cdot & \cdot & \cdot & & \cdot \\ a_{m1} & a_{m2} & a_{m3} & \cdots & a_{mn} \end{matrix}$$

the data elements $a_{mn}$ are usually arranged in sequence of column index n or row index m, and they are stored in respective address of the memory device in order of the element index mn. If it is requested to access the data elements in order of the column index n, that is in succession of $a_{11}$, $a_{12}$, $a_{13}$..., the contiguous vector access described above is convenient. But if it is requested to access the data elements in the order of row index m, that is in the succession of $a_{11}$, $a_{21}$, $a_{31}$..., there occurs the necessity of the distanced vector access.

The memory device is provided with a bank controller which controls the access to each of the banks or gives priority to the access. While a bank is being accessed by a processor, the bank controller prohibits further access to this bank. When access to this bank is over, the bank controller enables other processors to access this bank. At first, such bank controllers were provided for each of the banks. But, as the number of the banks increases, the expense for the hardware increases, therefore in modern processors, there are proposed various bank controlling method to reduce the number of bank controllers and to economize the memory device.

In an exemplary bank control method, a time slot is given to each of the banks during which the access to the bank is allowed, and the time slot is shifted from one bank to another in sequence. For example, as shown in lower half of FIG. 1, the access to bank 1 is allowed only in the time period $T_1$. During this time period, the access to other banks is forbidden. In the next time period $T_2$, the bank 2 is enabled, and the other banks are forbidden. In the following time period T₃, only the bank 3 is enabled. Like such manner, all of the banks are enabled subsequently one by one. Such control is called as sequential bank control.

Another proposed controlling method is grouping of the banks, and a access controller is provided for each of the groups. For example, all of the 12 banks are grouped into four groups each having three banks. Each bank controller checks three banks, and if one of the banks in the group is responding to an access, it forbids access to the group. In the description hereinafter, the disclosure will be given with respect to the sequential bank control, but it will be apparent for the one skilled in the art that the discussion can be applied to any of such bank controlling method.

As an example, how data is stored in a distanced vector addresses and accessed in an existing processor will be described. FIG. 3 is an address chart having sixteen-way interleave and a stride or distance of three. As has been mentioned before, these banks are enabled one by one to respond to an access within a predetermined time slot. So, in this case, first, the data in address 0 in bank 0 is accessed during the first time slot. In the description hereinafter, a memory cell having an address number and a data stored in it are both called simply an address unless specially identified. So, a wording "access to an address" means to access to a data stored in a memory cell having the address number. The next address to be accessed is 3 in the bank 3, but the processor is forbidden to access to the bank 3 during next two time slots. Then in the fourth time slot, the address 3 in the bank 3 is accessed. In such a manner, if one address is accessed, the following two time slots are skipped without accessing any bank. In the above example, therefore, only one address is accessed in each three time slots in the data sequence 0, 3, 6, 9, C, and F. Then the addresses 12, 15, 18, 1B . . . are accessed in, succession. Such a process is repeated until all of the distanced vector addresses are accessed. As can be understood form above explanation, the access to each of the data elements in a vector address is done during only one time slot among several time slots covering one distance of the address. So, the total access time to the distanced vector address takes a long time. In the example of FIG. 3, 48 time slots are necessary to access to 16 addresses. Generally, the throughput of the memory device decreases approximately 1/D when it is accessing a distanced vector address having a distance D, compared to that when it is accessing to a contiguous vector address having the same number of the data elements.

The reason why such an inconvenience occurs is attributed to the address generator. In a conventional address generator, the addresses are generated in order of the address indices. Namely, in the case of FIG. 3, the addresses are generated in order of 0, 3, 6 ... 2A and 2D. Therefore, the processor has to the wait several time slots before it accesses to the next address. An exemplary circuit configuration of an existing address generator is shown in FIG. 4. In this figure, a start address is set in a start address register (SADR) 51 and distance is set in a distant register (DIST) 52. In FIG. 4, the value of distance 3 is added to the start address 0 by an adder 53, producing a new address number 3. This number is registered in an address register 54 via the register 51. And then, the distance 3 is again added to the address number 3, producing a new address number 6, and so on. In such a manner, new addresses are generated one after another in order of the address index. Accordingly, the addresses 0, 3, 6, 9, C, F, 12, 15, . . ., are obtained in sequence. These generated addresses are stored in the address register 54 for a while, and accessing of the memory 55 is carried out.

It will be understood that accessing the memory with a constant stride using the conventional address generator takes very long time. This is a big determined to the processing speed in a high speed vector processor.

SUMMARY OF THE INVENTION

An object of the present invention, therefore, is to provide a methods for accessing constant stride addresses with high speed.

Another object of the present invention is to provide equipment which enables access to a distanced vector address with high speed.

Still another object of the present invention is to realize said equipment with ordinary hardware.

A further object of the present invention is to improve the throughput of a memory device for vector access.

All of these objects are attained by generating the addresses in order of the memory bank which is enabled to be accessed. According to the present invention, a novel address generator is provided. With this address generator, the addresses are generated not in order of the address index, but the address is generated in order of. bank index to be accessed. Namely, the addresses for the example of FIG. 3 are generated subsequently 0, 21, 12, 3, 24, 15, 6 . . . , as shown in FIG. 5. By doing so, each of the memory is accessed without skipping a bank. So, there is no waiting time in the memory device due to the skipping of the banks. Therefore, the total access time for the D distant vector addresses is reduced to approximately 1/D of existing memory systems.

In short, the present invention provides a method for generating the address numbers of a distance vector address, arranged not in order of the address index but in order of the bank index, and to provide an address generator which putputs successively such address numbers.

The results of the present invention are, therefore, applicable to so called super computer which has high processing performance aimed for scientific and technical calculations.

Further detail and advantages of the present invention will become apparent in a detailed description of the invention to follow and accompanied drawings.

BRIEF DESCRIPTION OF THE DRAWINGS

FIG. 7 is an address chart for an example of distanced vector address having a long length.

FIG. 16 is an example of DISTANCE - DELTA chart.

FIG. 17 is an address chart of a distanced vector address corresponding to an example of which the values of B and D are not coprime to each other.

Throughout the drawings, the same reference numerals designate and identify the same or similar parts.

DETAILED DESCRIPTION OF THE PREFERRED EMBODIMENTS

Figure 1:
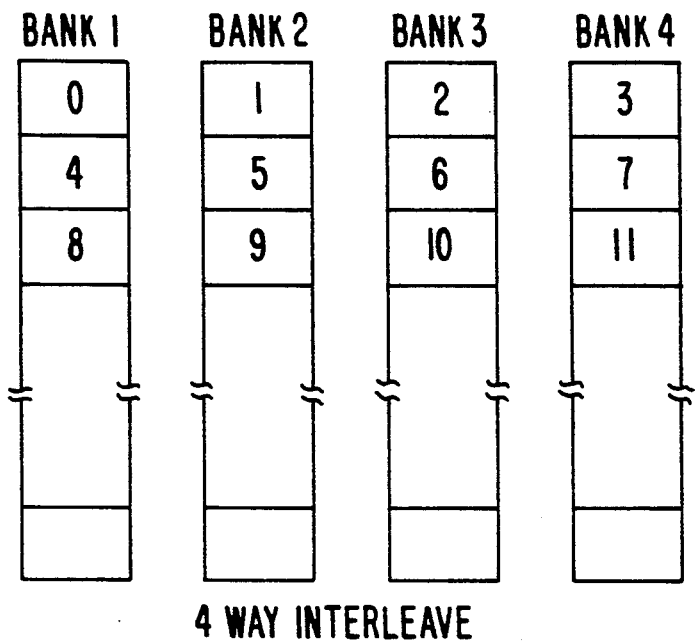
FIG. 1 is a diagram illustrating how address numbers are interleaved in memory banks, and how these banks are accessed in a time sequence.
Figure 1:
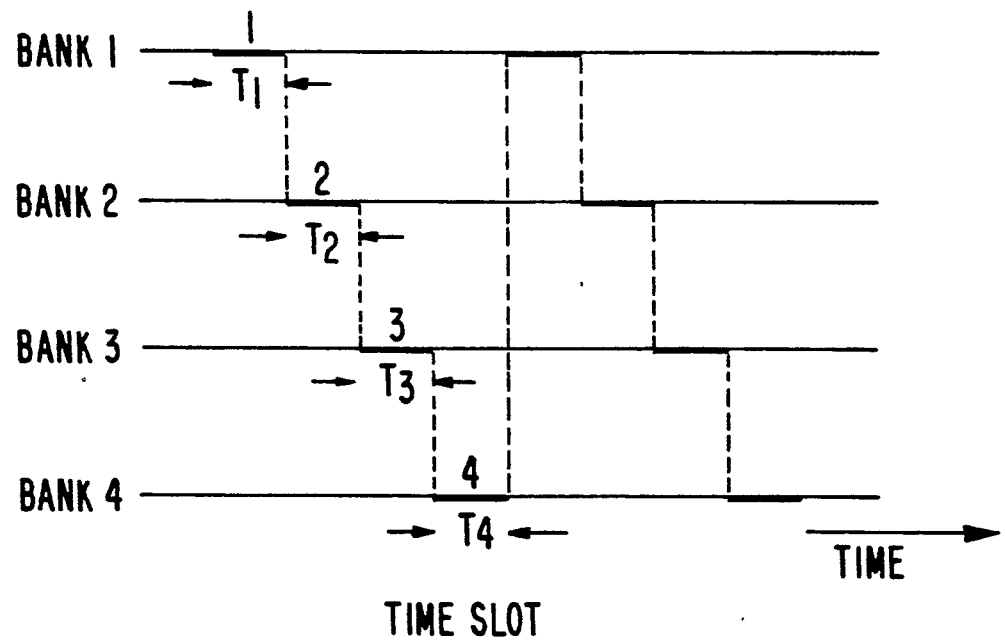
Figure 2:
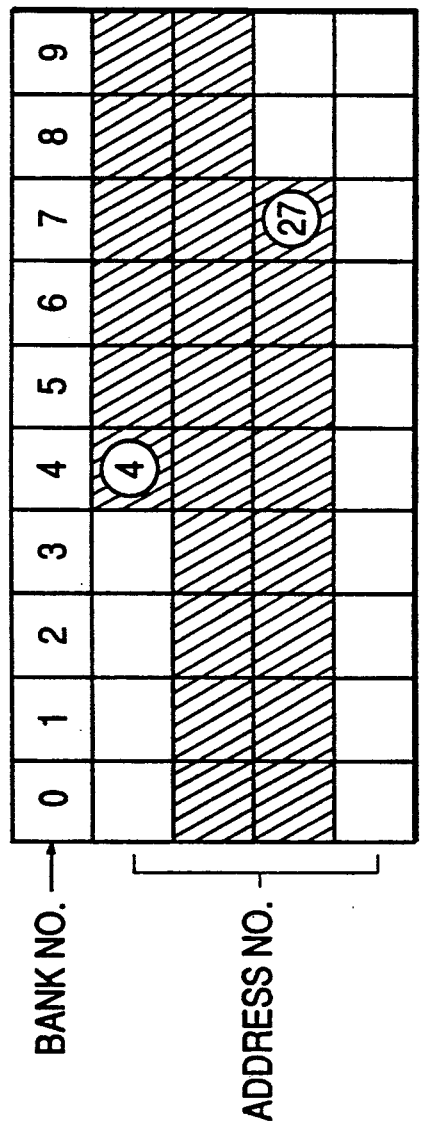
FIG. 2 is an address chart illustrating how a contiguous vector address is stored in a memory device having plurality of memory banks.

The fundamental concept of the present invention is based on following mathematical consideration. It is known in the art as the Euclidian Algorithm or method of mutual division, that if integers B and D are coprime to each other, there exist positive integers a and c satisfying the following equation $$a.B + c.D = 1 (\text{mod } B) \quad (1)$$

The right side of the equation means a number integral multiple of B plus 1, or in other words, if this number is divided by B it leaves a remainder of 1. The number B is called as modulo or modulus. Therefore, the equation means there is a combination of numbers a.B and c.D which has a remainder of 1 if it is divided by B.

Since a.B is a multiple of B, the equation (1) is simplified as $$c.D = 1 (\text{mod } B) \quad (2)$$

The number c is called as delta index hereinafter.

The present invention utilizes this relation. Namely, if B is an interleave number of the address, that is the number of the banks, and D is the distance of the vector address, we can get a number c (positive integer which makes the multiple of D by c become by 1 larger than the multiples of the interleave B of the address number. This means that, starting from any address in any bank, if the address number is added to a number which is c times of the distance D, the address number becomes one which belongs to a bank next large indexed to the initial bank.

Above relation will become more apparent from following example. If the interleave B is 128, and the distance D is 7. This means the example is incorporated to a large memory device having 128 banks we can get a relation $$55 \times 7 = 3 \times 128 + 1$$

Therefore, c=55. This means that if the address in any bank is skipped 55 times with a stride of 7, the new address is positioned next in a bank which is positioned to the initial bank.

So, if an index of a bank which includes an address having index i is written as FB(i), the starting address of the vector address is 1, and the bank index of the starting bank which includes the starting address is written as SB, the relation between the indices of above example becomes $$FB(1) = SB$$

$$FB(56) = SB + 1$$

$$FB(111) = SB + 2$$

$$FB(38) = SB + 3$$

$$FB(93) = SB + 4$$

$$FB(20) = SB + 5$$

$$FB(75) = SB + 6$$

$$FB(2) = SB + 7$$

$$\vdots$$

$$FB(19) = SB + 126$$

$$FB(74) = SB + 127$$

Therefore, if the indices of 1, 56, 111, 38, 93 . . . are generated successively, a quick access to the vector address is possible, because there is no need to wait for a while to skip the banks after accessing to one address to access to the next address.

Figures 5, 12:
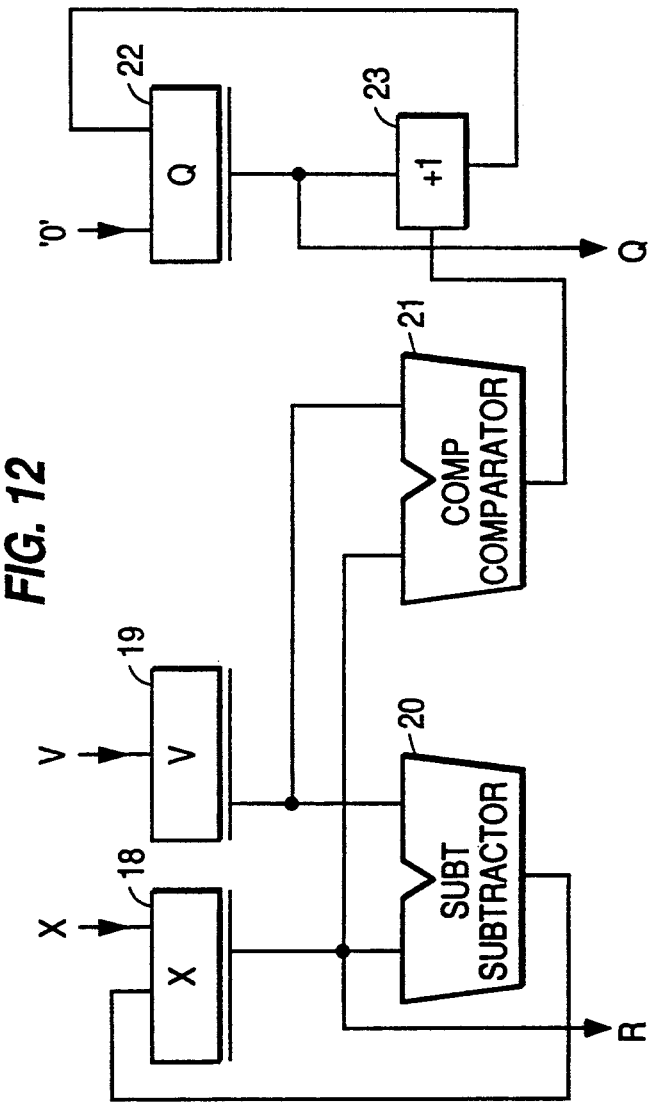
FIG. 5 is an example of vector address which is arranged in the order of bank indices.
FIG. 12 is a block diagram illustrating an example of a divider circuit used in the present invention.

Next, a principle of how an address generator of the present invention outputs the address indices in the order of bank index will be explained. The disclosure will be given, for better understanding, with respect to an embodiment which outputs the address numbers as shown in FIG. 5.

In this case, the number of banks B is 16 and the distance D is 3. So, one of the solution of the equation (2) is c=11, that is $$11 \times 3 = 2 \times 16 + 1$$

This means that if the address number is increased as much as $11 \times 3$ (=33), it becomes equal to the sum of integral multiple of the interleave and unity. Therefore, the bank index of the bank which includes that address is increased by 1.

Figure 6:
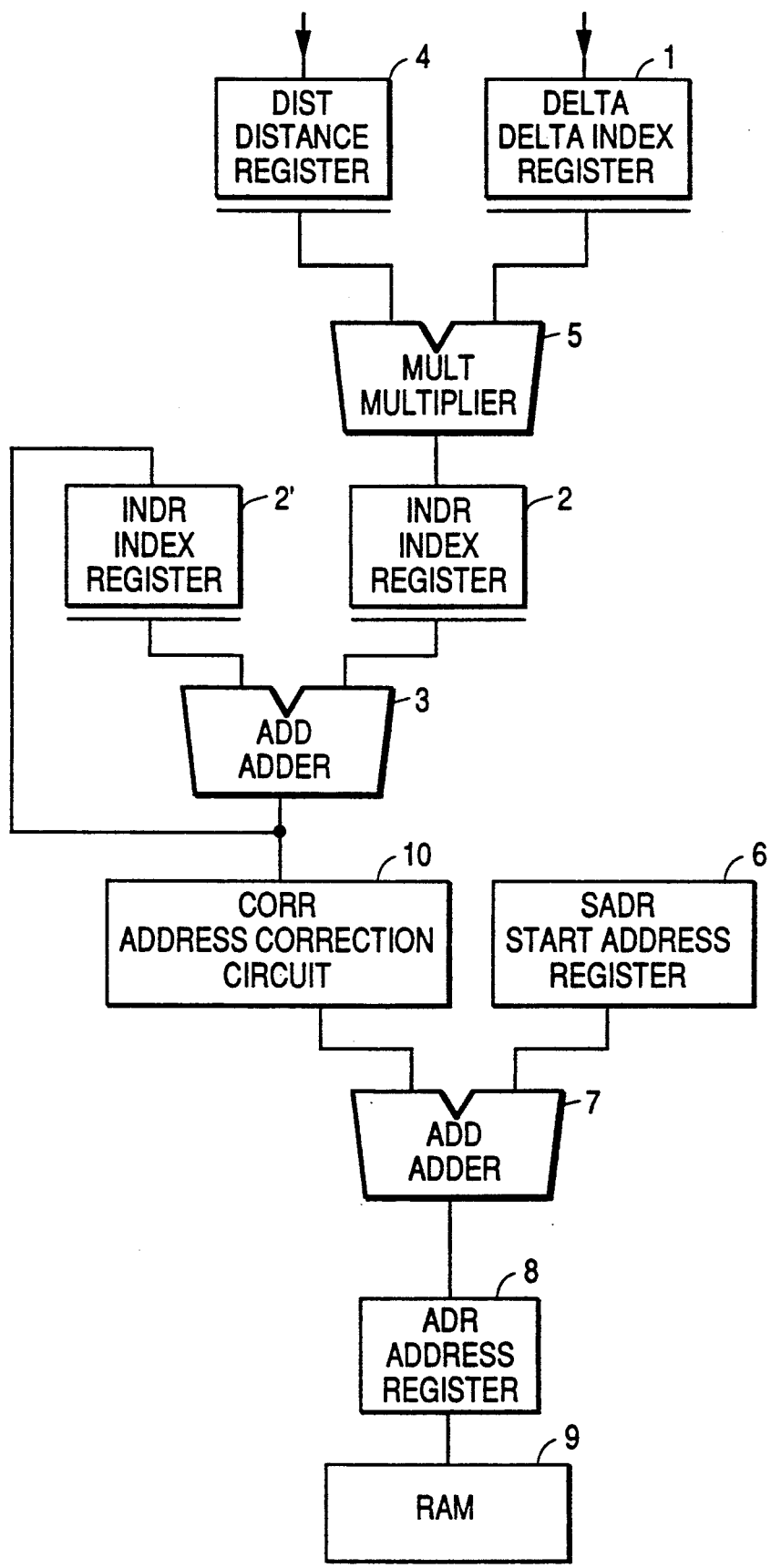
FIG. 6 is a block diagram illustrating an operation principle of a distanced vector generator of the present invention.

FIG. 6 is a block diagram illustrating a principle of the address generator of the present invention which is operated according to the above described logic. The value of c (=11 in the example of FIG. 5) is set in a delta index register 1, and and the distance D (=3) is set to a distance register 4. These values are multiplied in a multiplier 5 and sent to a first index register 2. There is provided a second index register 2' which is set to zero at a starting time. The values in the first and second index registers 2, 2' are added to each other by an adder 3, of which output is fed back to the second address register 2', and the value in the second register 2' is replaced by the number output from the adder 3. Accordingly, the output of the adder 3 becomes successively 0, 33, 66, 99 . . . When the starting address number is added to these numbers, they correspond to the required address numbers.

Figure 3:
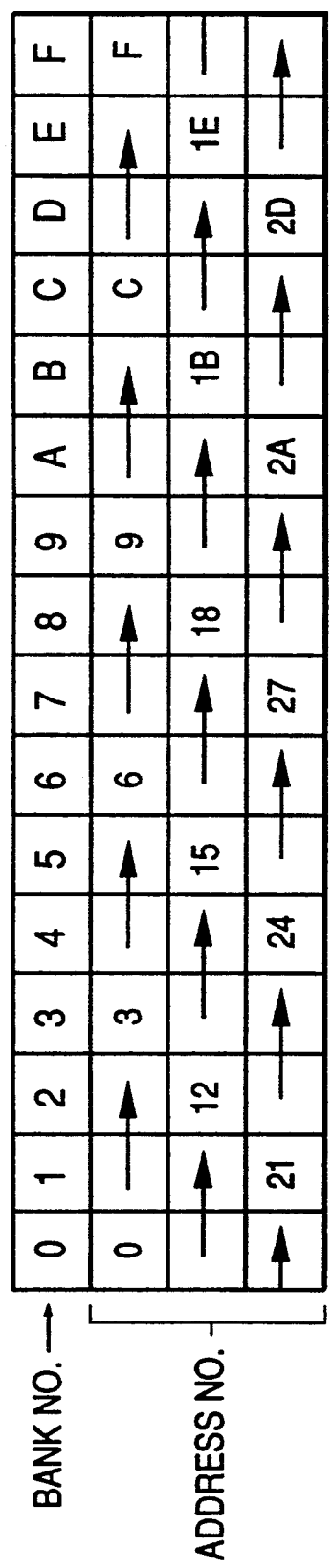
FIG. 3 is an address chart illustrating a distanced vector address stored in a memory banks.
Figure 4:
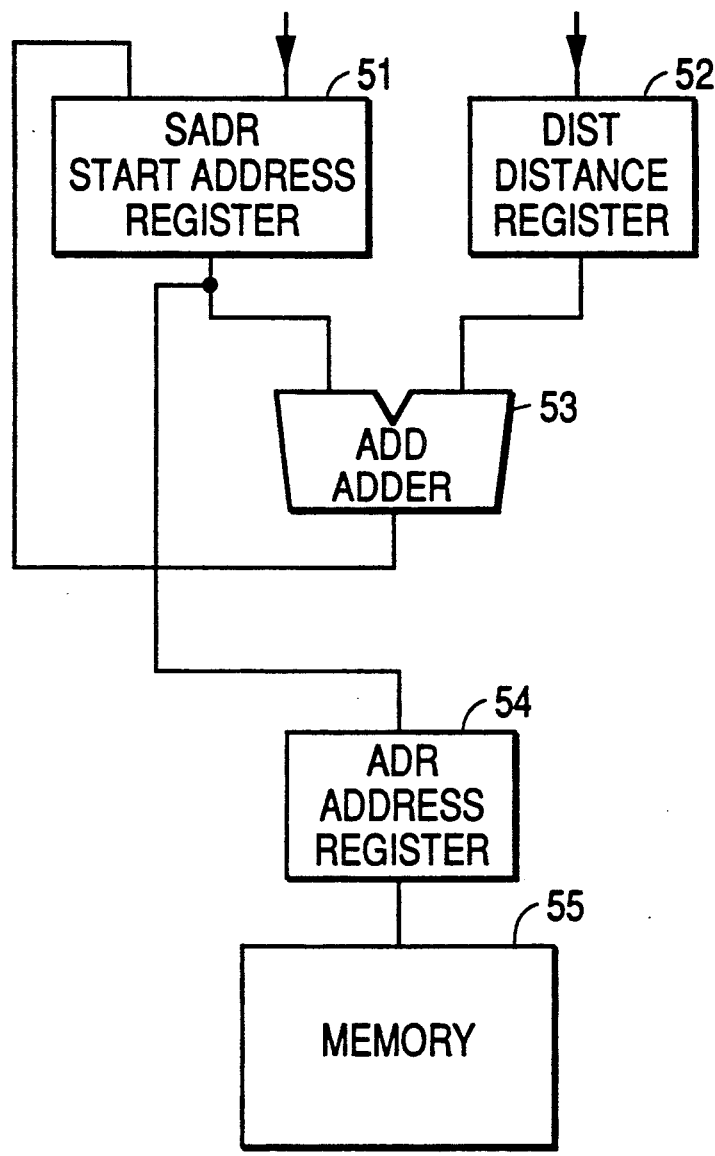
FIG. 4 is a block diagram showing an existing address generator.

The outputs of the adder 3 corresponds to the required addresses, but they are not exactly the required addresses. As can be seen from FIGS. 3 and 5, the address must be replaced by a number having a modulus of B×D. This correction is done in an index correction circuit 10 in the block diagram of FIG. 6. The function and configuration of the index correction circuit 10 will be described below.

FIG. 7 illustrates a chart of addresses in a memory device having 16 banks (B=16). The access is requested to skip 5 addresses between each other. Therefore, the distance D is 5. The delta index c is calculated from equation (2) as 13. In the chart, the required addresses are identified by shading. Since c×D=65, the adder 3 of FIG. 6 outputs successively 0, 65, 130, 195 . . . But a problem occurs, in this manner, the addresses such as 50, 35, 20 etc. are not obtained. Therefore, the outputs of the adder 3 must be corrected to turn back to the initial index when the output indices exceed the maximum index of (B×D), that is 80 in this example. That means the indices should be replaced by R(mod y) where y equals to the maximum index. That is 80 in this example. Similarly, if the required addresses have a maximum address of 200 for example, the output address indices should be replaced by R(mod (B×c×D)), that is in this example, R(mod 1040), and the address indices exceeding 200 should be neglected.

Figure 8:
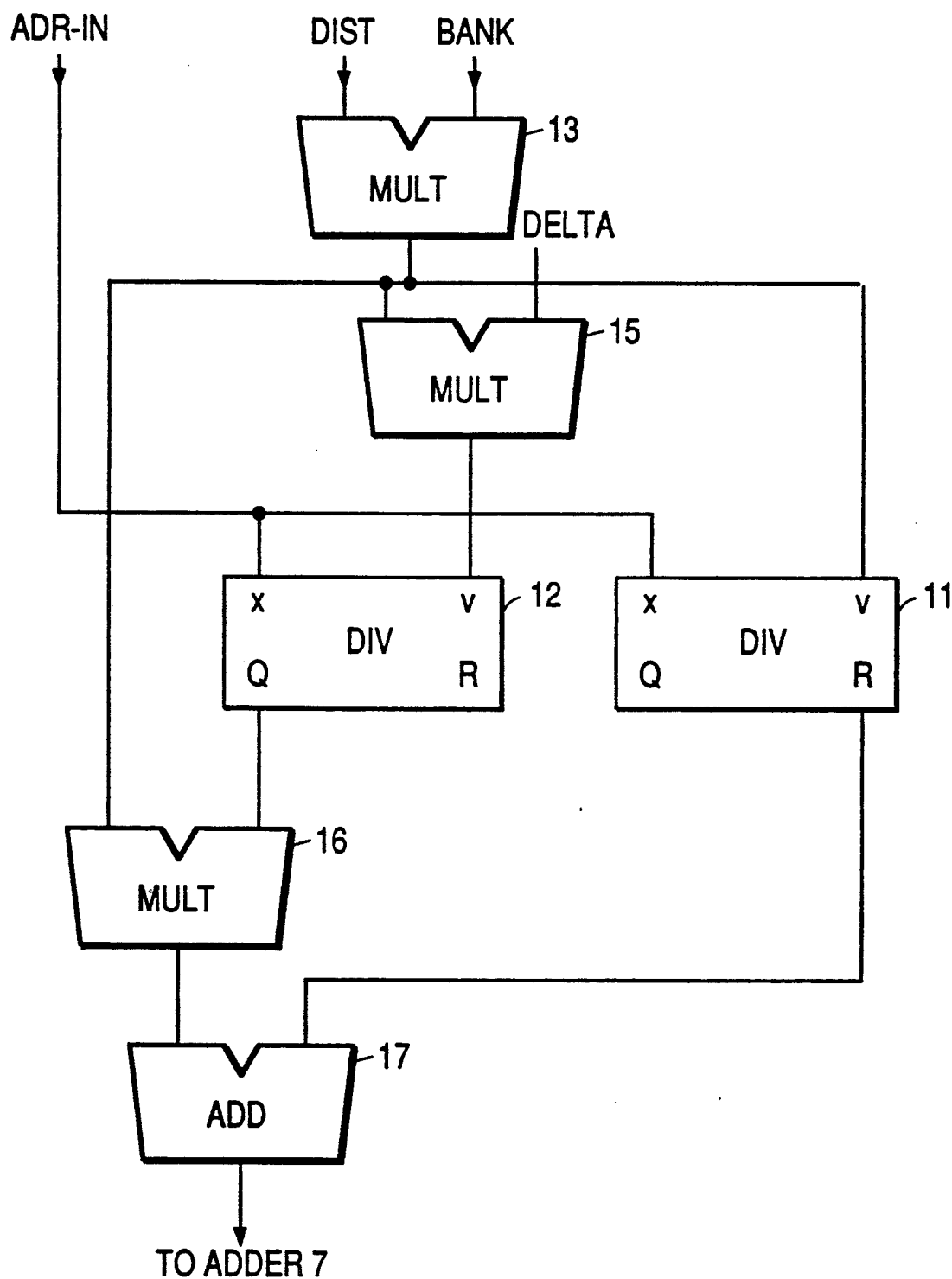
FIG. 8 is a block diagram illustrating an address correction circuit used for an address generator of the present invention.

The address correction circuit 10 in FIG. 6 which performs above functions is illustrated in FIG. 8. The correction circuit contains two dividers 11 and 12. The divider performs the following operation.

$$x \div y = Q \text{ and } R \quad (3)$$

where Q is the quotient and R is the remainder. This relation can be written as $$x = y \times Q + R \quad (4)$$

or using the modulo, it may be replaced by $$x = R \ (\text{mod } y) \quad (5)$$

The configuration of the divider will be explained later.

The output of the adder 3 (address indices) in FIG. 6 are successively fed to a terminal ADR-IN (FIG. 8) and fed to respective x terminals of the dividers 11 and 12. The values of c, B and D are applied to respective terminals of DELTA, BANK and DIST (FIG. 8). These notations written in capital letters are also used as a value applied to respective terminals hereinafter. In the following description, the case of FIG. 7 will be referred to as an example for better understanding. Referring to FIG. 7, it will be apparent that the first group of indices which are denoted as G-1 in the chart are obtained if the ADR-IN is replaced by R(mod 80). This means in generally that the ADR-IN (x) should be replaced by $$R(\text{mod } y) \text{ where } y = B \times D \quad (6)$$

This operation is done by the first divider 11 in FIG. 8. In FIG. 8, the y terminal of the divider 11 is supplied from a multiplier 13 which provides B×D (16×5=80). Accordingly, the divider 11 outputs successively 0, 65, 50, 35, 20 . . .

Inspecting FIG. 7, it will be understood that the second group of indices which are denoted as G-2 can be obtained respectively adding by 80 (=B×D) to the corresponding indices of the first group. And the third group of the indices denoted as G-3 can be obtained by adding 160 (=80×2) to the corresponding first group indices. It will be apparent that the succeeding indices can be obtained in such a manner, adding a number of B×D ×Q to each of the indices of the group one.

Such operation is done by the second divider 12, third and fourth multipliers 15, 16 and an adder 17. In FIG. 8, the divider 12 performs an operation $$x/y = ADR-IN/(c \times B \times D) = Q \text{ and } R$$

Because the second multiplier 15 provides B×D×c (=16×5×13=1040). This number is the value of x corresponding to an index 80 in FIG. 7. Therefore, for all indices in the first group G-1, the value of x is smaller than 1040, in the example of FIG. 7. Therefore, the second divider 12 outputs 0 as the quotient Q. For the second group G-2 of the indices, the value of x becomes equal to or larger than 1040 and less than 2080 (=2×1040). So the second divider outputs 1 for the quotient Q. Similarly for the third group G-3 of indices it will become apparent from careful inspection of FIG. 7, that x values are between 2080 and 3120. So the Q becomes 2.

In FIG. 8, the third multiplier 16 multiplies the value of B×D (=80) by Q (=0, 1, 2 . . .). This is added by the adder 17 to the first group indices outputted from the R terminal of the first divider 11. Thus the address numbers for any size (length) of data is obtained. The process to stop the index generation for over the maximum index (200 for example) will be discussed later with respect to total configuration of the address generator shown in FIG. 14.

Referring back to FIG. 6, the starting address is set to a start address register (SADR) 6, and added to the output of the address correction circuit (CORR) 10 by a second adder 7. The output of the second adder 7 is registered in an address register (ADR) 8 as the requested addresses, and the data stored in the RAM 9 is accessed by this new address.

Figure 9:
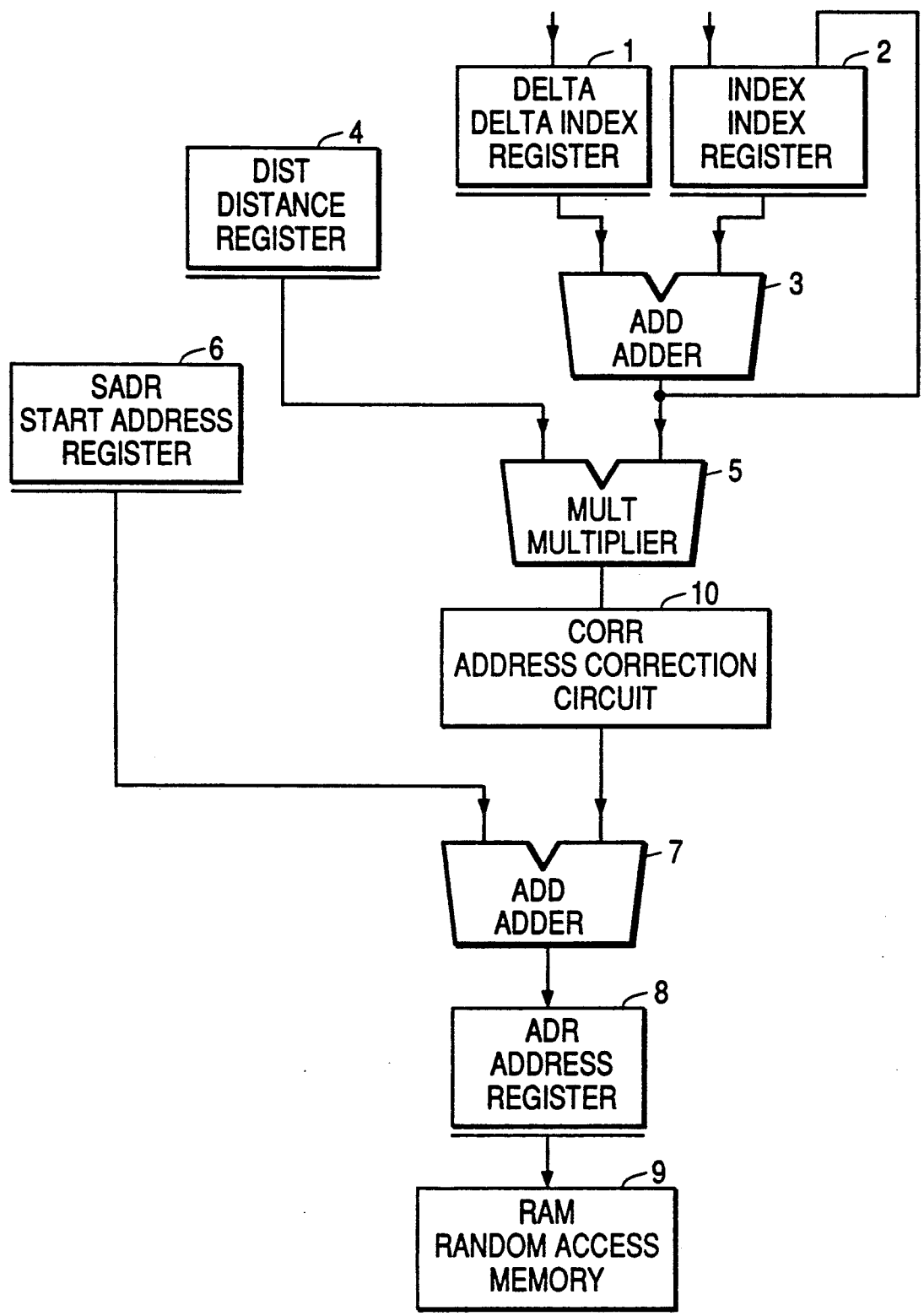
FIG. 9 is a block diagram for illustrating operation of an embodiment of a vector address generator of the present invention.

Above principle of address generation can be modified in various ways. FIG. 9 shows another embodiment of the address generator by the present invention corresponding to a modification of FIG. 6. Compared with FIG. 6, the system of FIG. 9 has varied the positions of the multiplier 5 and the adder 3. Explanation will be given again using the example of FIG. 5. In FIG. 9, same reference numerals designate the same parts described in FIG. 6. The values of c (=11) and distance D (=3) are set respectively to a delta register 1 and a distance register 4. To the value of c is added the distances sent from the index register 2 in an adder 3, and fed back to the index register 2 to replace the former index in it. The index register 2 is set to 0 by the starting condition. So, the output of the adder 3 becomes successively 0, 11, 22, 33, 44, 55, . . .

The distance value D (=3) set in the distance register 4. This value and the output of the adder 3 are multiplied by the multiplier 5, producing successive outputs of 0, 33, 66, 99, 132 . . . These values are corrected (replace by a modulus form) by the address correction circuit 10, described above. So, the output of the address correction circuit 10 becomes, successively, 0, 33, 18, 3, 36 . . . To these values, the start address (=0 in this example) is added by the adder 7 to provide the required addresses, 0, 33, 18, 3, 36 . . . When these values are expressed in hexa-decimal numerals, they become 0, 21, 12, 3, 24 . . . as shown in FIG. 5.

Figure 10:
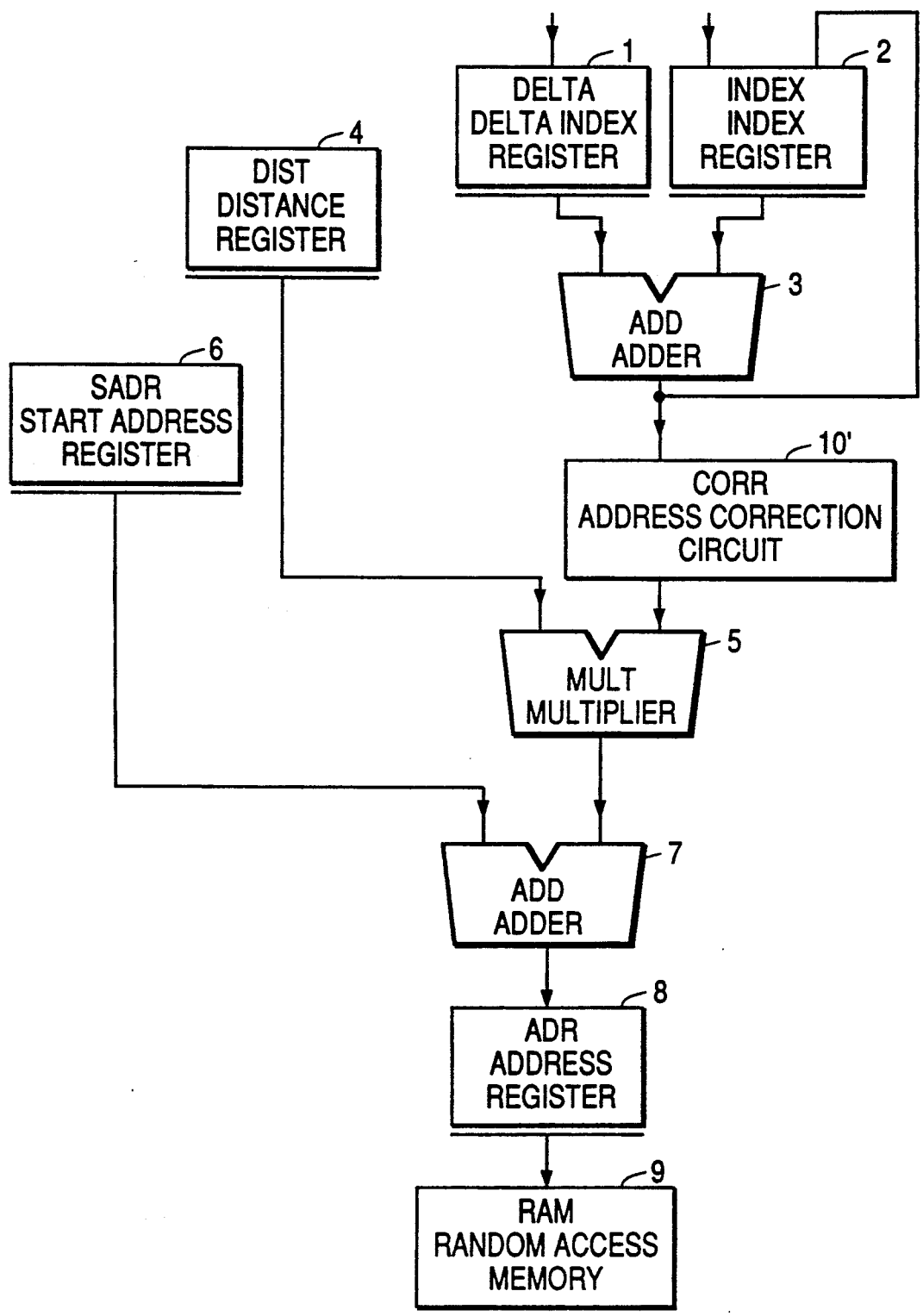
FIG. 10 is a block diagram for illustrating operation of another embodiment of a vector address generator of the present invention.

FIG. 10 shows another modification of the system of FIG. 9. Comparing this system with that of FIG. 9, the address correction circuit 10' is positioned between the adder 3 and the multiplier 5. The same reference numerals designate the same components of the foregoing drawings. In this system, the outputs of the adder 3 is corrected, that is replace by modulo form. It will be understood easily by those in the art that the system of FIG. 10 provides the same addresses as does the system of FIG. 9. The outputs of the adder 7 are registered in an address register 8, and the memory 9 is accessed by the address number given from the address register 8.

Figure 11:
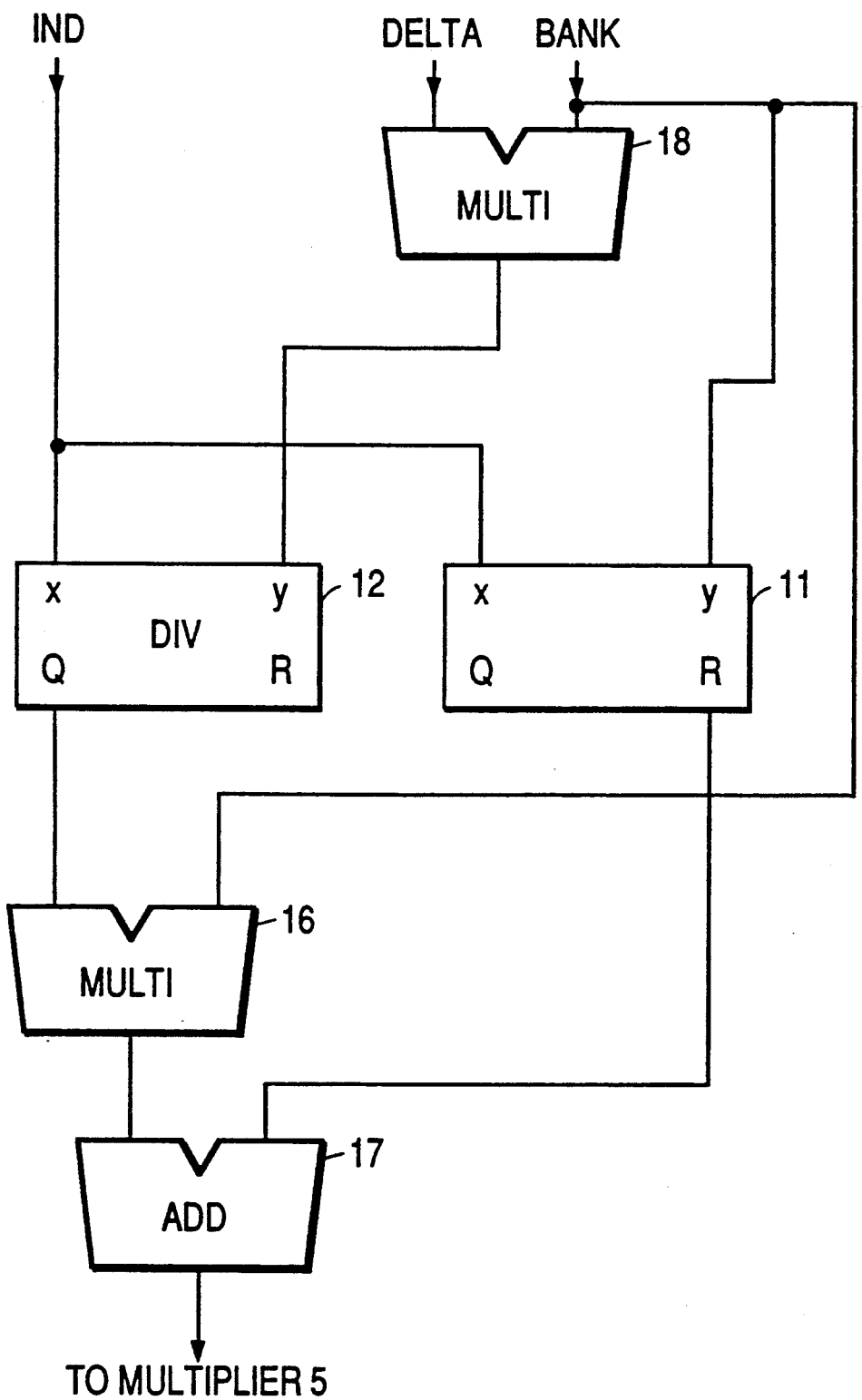
FIG. 11 is a modification of the address correction circuit shown in FIG. 8, to be applied to the circuit of FIG. 10.

In the system of FIG. 10, the correction circuit 10' should be modified as shown in FIG. 11. Compared with the circuit of FIG. 8, the multipliers 13 and 15 are eliminated adn replaced by one multiplier 18. Other circuit elements are all the same as those of FIG. 8. The operation of this system will be easily analogized by those skilled in the art.

So, in a manner described above, the vector address is accessed in the order of the memory bank index, therefore, no waiting time is necessary for the processor, because the necessary addresses are generated successively in the order of bank index. Thus quick access to the distanced vector address is attained.

Figure 13:
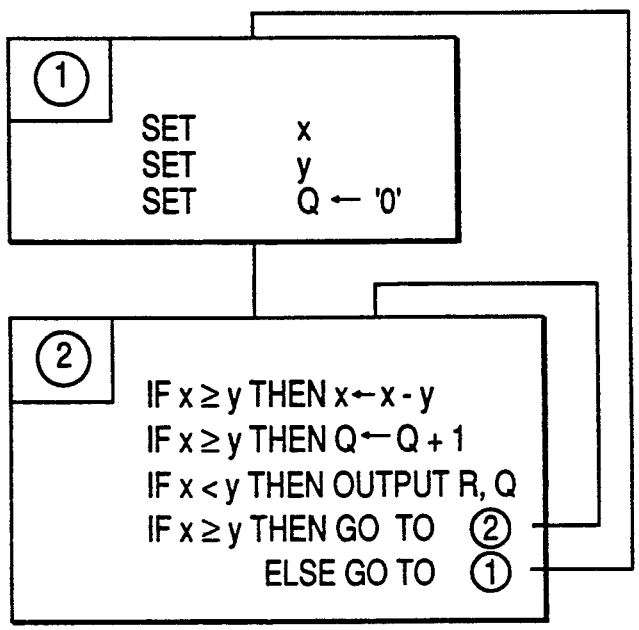
FIG. 13 is a flow chart for the divider circuit shown in FIG. 12.

The index correction circuit 10 or 10' described above comprises a divider circuit which calculates the equations (3), or (5). Any circuit that performs such operation may be applicable. An example is shown in FIG. 12. In an x register 18 and y register 19 are respectively set the value of x and y. As can be seen in FIG. 12, the divider circuit fundamentally comprise a subtracter 20, a comparator 21 and a counter circuit 22. The values of x and y are compared by the comparator 21. If x is smaller than y, then x equals to R, and if x is larger than or equal to y, then y is subtracted from x by the subtracter 20, and the output of the subtractor 20 is fed back to the x register 18, and replaces the former x value. The counter 22 is set to zero at first, and incremented by 1 by a plus one generator 23, each time when the comparator 21 detects that x is larger than or equal to y. This process is repeated until the value in the x register becomes smaller than y. The value remaining in the x register 18 is equal to the remainder R, and the value in the counter is the quotient Q. A flow chart for this divider circuit is given in FIG. 13.

Figure 14:
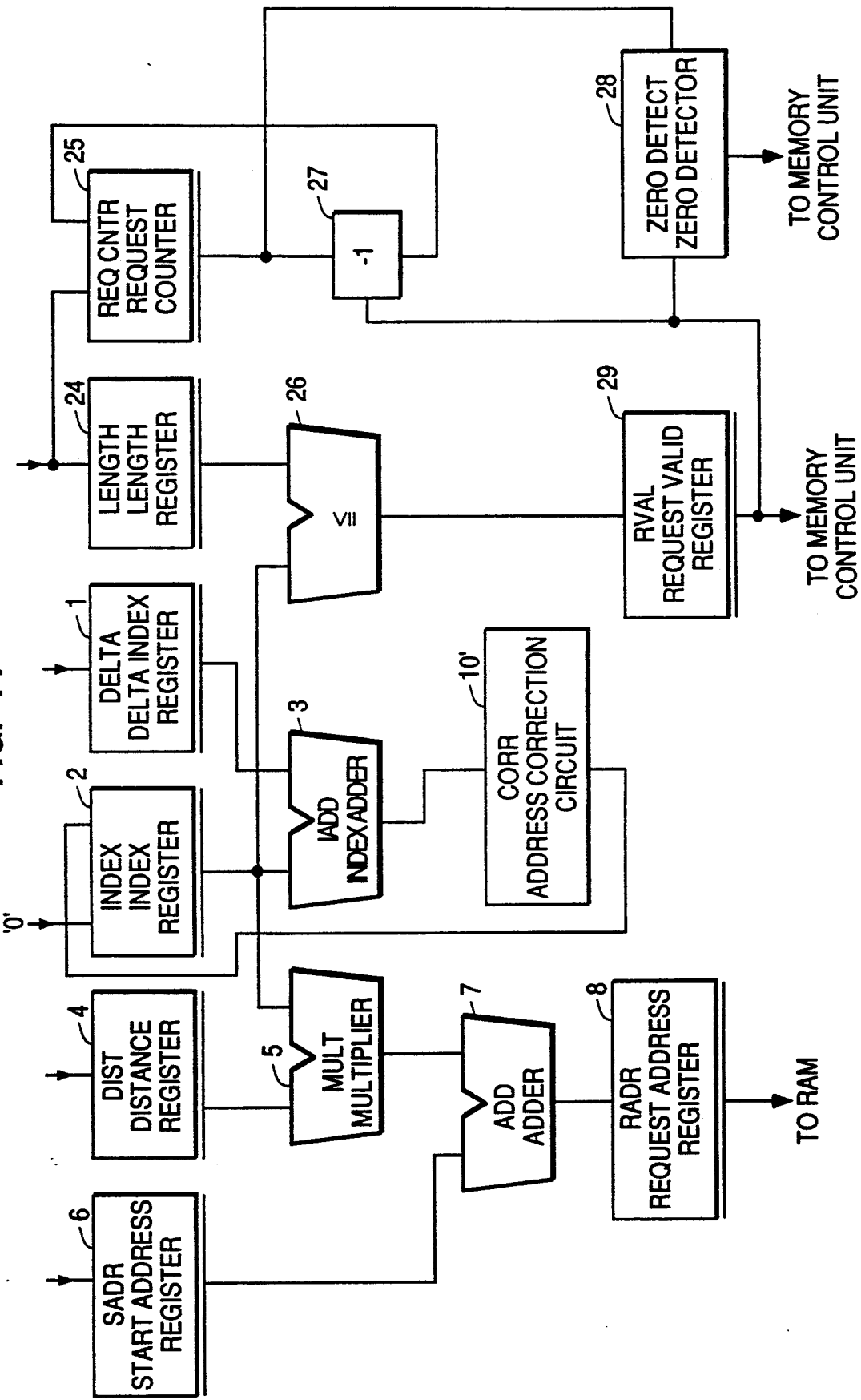
FIG. 14 shows a total configuration of a vector address generator of the present invention.

A total configuration of an address generator according to the present invention is shown in FIG. 14. The left side half of the figure is equivalent to the circuit of FIG. 10. The reference numerals, therefore, corresponds to those of FIG. 10. A minor modification will be noticed in the input side of the multiplier 5. Namely, in FIG. 10, the input of the multiplier 5 is connected to the output side of the correction circuit 10', but in FIG. 14, the input of the multiplier 5 is supplied from the index register (INDEX or simply IND) 2. It will be understood by one skilled in the art that, the difference is not an essential one, it depends only on the timing technique of the system. In the disclosure to follow the explanation will be done with respect to the flow of data, and the discussion on timing will be omitted for the sake of simplicity.

On the right half side of the figure are provided a length register (LENGTH) 24 and a request counter (REQ CNTER or simply REQ) 25. To these registers is set the length of the vector address, that is a number corresponding to the difference of indices between the end address and the starting address. Referring to the example of FIG. 7, if the required data are those having the address from 0 to 200, the number 41 is set to the LENGTH. If the starting address is 10 and the end address is 200, then the length should be 39. At each cycle of the index adder (IADD) 3, the IND is compared with the LENGTH by a comparator 26. If IND is smaller than or equal to the LENGTH, then the comparator 26 outputs 1, and the value 1 is stored in a request valid register (RVAL or simply VAL) 29. And if the IND is larger than LENGTH, then the comparator 26 outputs 0, and the VAL is replaced by 0. When the VAL is 1, a decrementor 27 outputs $-1$ and this value is fed back to the request counter 25. By such a manner, the REQ is reduced by 1 each time the index generator 2 outputs a new index. As the output of the INDEX increases, and when it exceeded the LENGTH, VAL becomes 0. When VAL is 0 and the REQ becomes 0 a zero detector 28 detects it, and sends a signal to the memory control unit (not shown) to stop the process of the address generation. The memory control unit which is a common unit provided in all of the memory devices for controlling the over all operation of the memory device.

Figure 15:
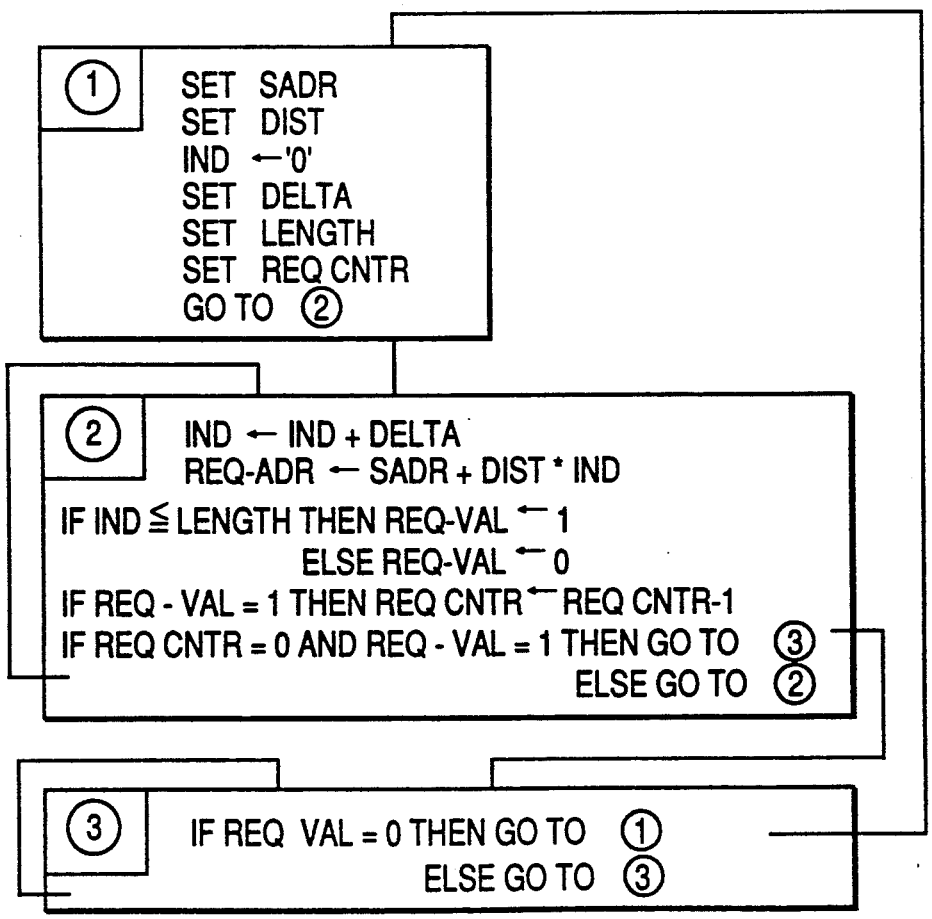
FIG. 15 is a flow chart for a vector address generator of FIG. 14.

A flow chart describing above process is shown in FIG. 15. In a step one, which is denoted by an encircled number 1, the start address, distance, delta and length are set, and the initial values for these registers are set. In step two which is denoted by an encircled number 2, the adding process is performed in IADD. And in, a step three denoted by an encircled number 3 the decision to continue the process or to end the process, and to enable receipt of the next request from the processor (not shown).

Figure 16:
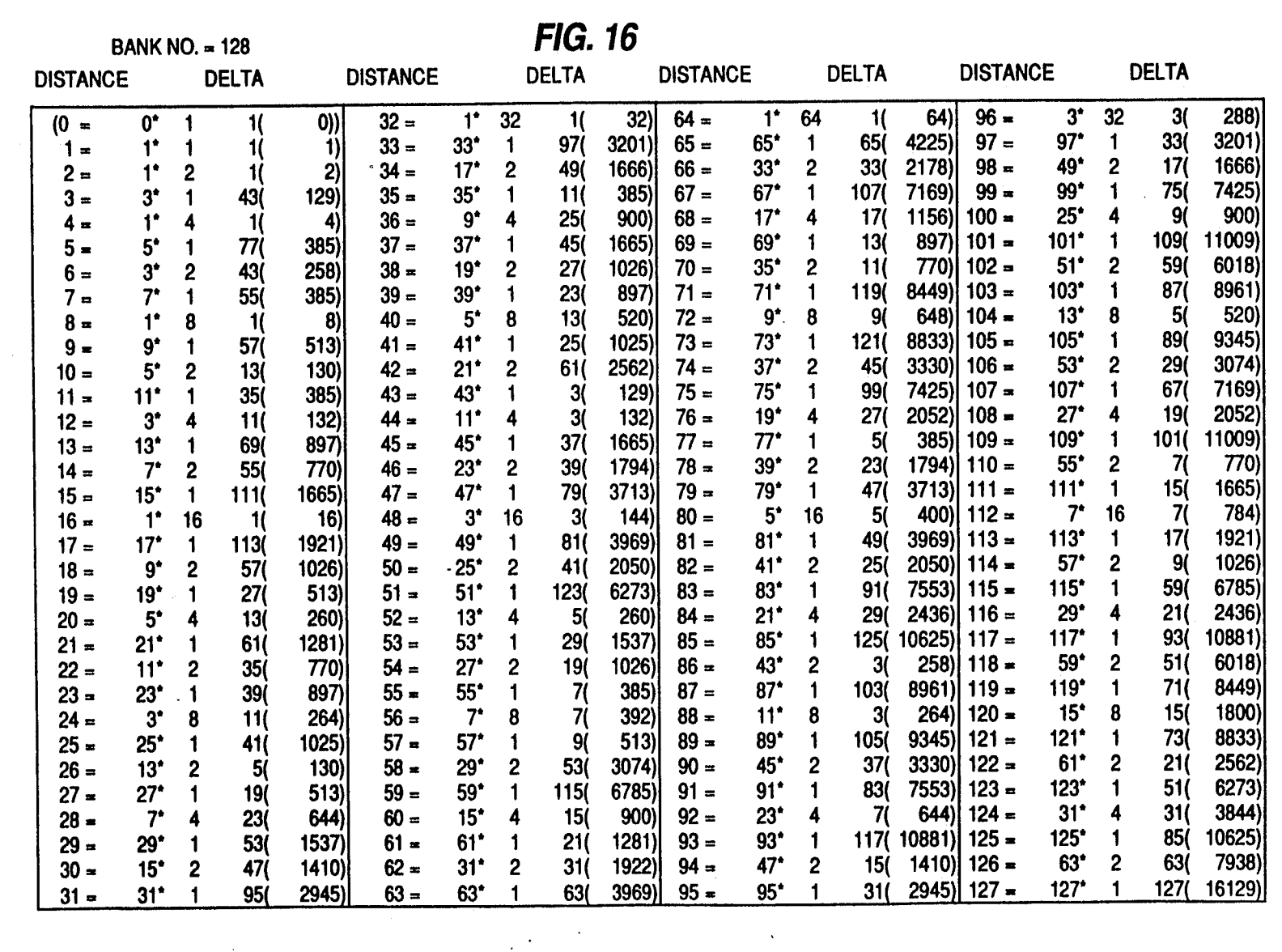

In the above explanations, the delta index c is obtained by calculation as a solution of equation (2). The calculation is not a difficult or troublesome one. But it is practical to use a chart indicating the value of c for various distance values of D. An example of such DISTANCE$-$DELTA chart is shown in FIG. 16. Since the bank number B is determined for each of the memory devices, only one chart is needed for each memory device. If such a chart is prepared for the memory device to be used, it is possible to obtain the value of c using the distance D given in the programming step.

FIG. 16 is an example of a DISTANCE$-$DELTA chart for a computer having 128 banks, that is B$=$128. In the chart, the first column indicates the distance number D. The value of D is factorized by $2^n$, and shown in the second column. For example, at a row of D$=$24 is shown it is equal to $3 \times 8$ ($=2^3$). The asterisk * means multiplication. In the third column is shown the delta index c. For example, in a row of D$=$34, the c value of 49 is given. Like such manner, the value of c is obtained very quickly in the chart. So, the programming becomes very easy. In the fourth column is shown in a braket the value of D$\times$c as a help of consideration. This is a number to be added to the address index in order to obtain the next address index which is included in the next larger indexed bank.

Further, practically, the DISTANCE$-$DELTA chart is memorized in each of memory devices. So, in programming it is not necessary to go over the DISTANCE$-$DELTA chart, when the bank number B and distance D is given on the program, a subroutine of the program looks over the chart to find the delta index c and generates the requested address numbers in a manner as has been described above.

As has been described before, in the foregoing disclosure, it has been assumed that the values B and D are prime to each other. But the invention is easily extended over the cases wherein B and D are not coprime to each other. It becomes apparent by testing each case, that if the value of D is modified, the constant stride access can be done with significantly improved throughput.

It, will be explained with respect to a case that the interleave B=16 and distance D=6, for example. Such addresses are shown in FIG. 17 identified by shading. As can be seen in the figure, the requested addresses are positioned in the banks indexed different by two between each other. In this case, distance 6 can be expressed as $3 \times 2$. Since 3 is coprime with 8, delta is found to be 3, because $$3 \times 3 = 1 \times 8 + 1 = 1(mod\, 8)$$

so, $$6 \times 3 = 1 \times 16 + 2 = 2(mod\, 16)$$

This means that, if index is increased by $6 \times 3 = 18$, the bank number is increased by 2. Therefore, if the value of B=16, c=3 and D=6 is given, the address generator described above will outputs the addresses identified with shadings as shown in FIG. 17. In this example, throughput of the constant stride, access is improved by approximately three times that of contiguous vector access. For example, during a time period in which a contiguous access is made to accesses to 0 address and then waits for access to address 6, the present device accesses three addresses: 0, 18 and 36.

It will be understood that, generally when B and D are not coprime to each other, there is a greatest common measure G for B and D. So, B and D can be expressed respectively as $$B = G \times B' \text{ and}$$
$$i\, D = G \times D'$$

using B' and D', equation (2) can be modified as $$c \times D' = 1(mod\, B') \qquad (2')$$

Therefore, it will be apparent that the address generator constructed under the rule of equation (2) where B and D are coprime to each other, is applicable without any modification to the case wherein B and D are not coprime to each other, if the modified value of B' and D' are used.

The above process is generalized and discussed below with reference to the DISTANCE-DELTA chart shown in FIG. 16. When distance is given, the value of delta (c) in the corresponding row of distance is found. For example, if D=50, then it will be found that c=41. As a special case, it will be noticed from the chart that for some values of distance for example, 2, 4, 8, 16 etc. the value of delta becomes to 1. In such cases, it will be understood that the addresses are all vertically aligned in several columns. In such special cases, therefore, the merit of the present invention can not appear. But it should be pointed out that the total access time even for such worst case never become longer than any other access scheme. And it should be further noticed, that it is a common sense of advanced programming technology to avoid designing a program to use a distance value of $2^n$ in order to arrange the necessary addresses in a column. So, in ordinary cases the present invention provides a splendid advantage over existing access methods.

Further, it will become apparent by checking the output indices for practical cases, that the method of distanced vector access disclosed above is applicable to a memory devices wherein the memory banks are group controlled without any modification of device.

In above disclosure of the invention, the explanations have been given with respect to some embodiments and examples, but it will be apparent that the spirit of the invention is not limited in those embodiments and examples. Therefore, various modifications of the circuits shown in the above disclosure may occur to the one skilled in the art. But they are all falling within the scope and spirit of the invention.

The circuit elements such as adder, subtractor, multiplier, register, counter etc. are all conventional ones, and are available as IC packages. Therefore, it is unnecessary to use any special circuit elements. But the throughput of the memory device can be improved very much compared to existing access schemes.

What is claimed is:

1. An apparatus for accessing a constant stride vector addressed memory device that stores a vector having a starting address and a stride D in a number of memory locations and that includes a number of interleaved memory banks (B) that are consecutively accessed and that have respective bank indexes, said apparatus including:
    a distance register connected to store distance signals representing the stride D;
    a delta index register connected to store delta signals representing a value c satisfying cD=1(mod B);
    index generating means for generating, based on the distance signals and the delta signal, index signals respectively identifying the memory locations of the vector in order of the consecutively accessed bank is; and
    adding means for providing the address signals to the constant stride vector addressed memory device based on the index signals.

2. An apparatus according to claim 1, further comprising:
    a start address register connected to store starting address signals representing the starting address, and wherein said adding means includes means for providing the address signals based on combining the index signals and the starting address signals.

3. An apparatus according to claim 2, wherein said index generating means includes:
    means for generating the index signals representing a value satisfying R (mod Bx D).

4. An apparatus according to claim 3, wherein said correction means comprises:
    means for providing first signals representing a value satisfying $B \times D$;
    means for providing second signals representing a value satisfying $B \times D \times C$;
    first and second divider means, each having x any y input terminals and Q and R output terminals, for performing the operation of $x + y = Q\, and\, R$ wherein x, y, Q and R are integers representing signals received at the x and y terminals and provided at the Q and R output terminals, and Q is a quotient and R is a remainder and, said first divider means having its x terminal connected to receive the index signals, and having its y terminal connected to receive the first signals;

said second divider means having its x terminal connected to receive the index signals, and having its y terminal connected to receive the second signals; and means, operatively connected to the Q output terminal of said second divider means and to the R output terminal of said first divider means, for multiplying the first signals and the signals from the Q output terminal of said second divider means, and for adding the result of this multiplication to the signals from the R output terminal of said first divider means.

5. An apparatus according to claim 3, wherein said index generating means further comprises correction means for changing the signals outputted from said adding means to signals corresponding to values of an equation $$x' = R'(\text{mod } B)$$

where R' has a value based on B.

6. An apparatus according to claim 5, wherein said correction means comprises:

means for providing first signals representing a value satisfying $B \times D$;

means for providing second signals representing a value satisfying $B \times D \times C$;

means for providing a signal representing a value corresponding to B;

first and second divider means, each having x and y input terminals and Q and R output terminals, for performing the operation of $$x + y = Q \text{ and } r$$

where x, y, Q and R are integers representing signals received at the x and y terminals and provided at the Q and R output terminals, and Q is a quotient and R is a remainder and, said first divider means having its x terminal connected to receive the index signals, and having its y terminal connected to receive the signal representing B;

said second divider means having its x terminal connected to receive the index signals, and having its y terminal connected to receive the first signals; and means, operatively connected to the Q output terminals of said second divider means and to the R output terminal of said first divider means, for multiplying the signal representing B and for adding the result of this multiplication to the and the signals from the Q output terminal of said second divider means, signal from the R output terminal of said first divider means.

7. A method of accessing a constant stride vector addressed memory device that stores a vector having a starting address and a stride D in a number of memory locations that includes a number of interleaved memory banks (B) that are consecutively accessed and that have respective bank indexes, said method comprising the steps of:

(a) providing distance signals representing the stride D;

(b) providing delta signals (c) representing a value c satisfying $c.D = 1(\text{mod } B)$;

(c) generating index signals using the distance signals and the delta signals so that the index signals represent memory locations in consecutively addressed memory banks; and (d) generating address signals for the constant stride vector addressed memory device based on the index signals.

8. A method for accessing a constant stride vector addressed memory device according to claim 7, further comprising the steps of:

providing staring address signals; and wherein step (d) includes the substep of:

generating the address signals based on combining the starting address signals and the index signals;

9. A method of accessing a constant stride vector addressed memory device according to claim 8, further comprising the steps of:

generating a signal $I_n$ based on multiplying the delta signal (c) and the distance signals (D);

modifying the signals $I_n$ based on the multiplication of the delta signals (c), the distance signals (D) and the number of consecutively addressed memory banks (B) such that the modified signals $I_n$ have a value representing a value expressed by $I_n = R_n(\text{mod } B \times c \times D)$; and adding a signal having a value representing $R_n$ to the starting address.

10. A method of accessing a constant stride vector addressed memory device according to claim 8, further comprising the steps of:

generating a signal $I_n$ based on multiplying the delta signal (c) and the distance signals (D)

modifying the signals $[I_n]$ $I'_n$ based on the multiplication of the delta signals (c), the distance signals (D) and the number of consecutively addressed memory banks (B) such that the modified signals $I'_n$ have a value representing a value expressed by $I'_n = [R_n]R'_n(\text{mod } B)$; and multiplying the signals representing $R'_n$ by the distance signals and adding the resultant value to the starting address.

* * * * *

UNITED STATES PATENT AND TRADEMARK OFFICE
CERTIFICATE OF CORRECTION

PATENT NO. : 5,134,695

DATED : July 28, 1992

INVENTOR(S) : Masayuki Ikeda

It is certified that error appears in the above-identified patent and that said Letters Patent is hereby corrected as shown below:

```
Column 11, line 3, change "prime" to --coprime--;
        line 40, change "iD=" to --D=--.
Column 12, line 35, change "cD=" to --c·D=--.
Column 13, line 38, change "x+y=Q and r" to
--x÷y=Q and R--.
Column 14, line 47, delete "[I·_n]" ;
        line 53, delete "[R·_n]".
```

Signed and Sealed this

Twenty-sixth Day of October, 1993

*Attest:*

BRUCE LEHMAN

*Attesting Officer*     *Commissioner of Patents and Trademarks*